United States Patent
Bramley

[19]

[11] Patent Number: 6,063,330
[45] Date of Patent: May 16, 2000

[54] PRESS HEAD AND DROSS POT FOR DROSS PROCESSING SYSTEM

[75] Inventor: Alan Bramley, Nottingham, United Kingdom

[73] Assignee: J. McIntyre Machinery Limited, Nottingham, United Kingdom

[21] Appl. No.: 09/068,810

[22] PCT Filed: Dec. 19, 1996

[86] PCT No.: PCT/GB96/03165

§ 371 Date: May 18, 1998

§ 102(e) Date: May 18, 1998

[87] PCT Pub. No.: WO97/26382

PCT Pub. Date: Jul. 24, 1997

[30] Foreign Application Priority Data

Dec. 19, 1996 [GB] United Kingdom ................... 9600942

[51] Int. Cl.[7] ................. C22B 7/04; C21B 3/04; C21B 3/00
[52] U.S. Cl. .................. 266/205; 266/227; 266/275
[58] Field of Search ....................... 266/205, 227, 266/275; 75/585, 672

[56] References Cited

U.S. PATENT DOCUMENTS

| | | | |
|---|---|---|---|
| 2,146,678 | 2/1939 | Jung | 22/130 |
| 2,217,093 | 10/1940 | Amidon | 266/37 |
| 4,003,559 | 1/1977 | Kuwano et al. | 266/204 |
| 4,057,232 | 11/1977 | Ross et al. | 266/227 |
| 4,137,073 | 1/1979 | Singleton | 75/68 R |
| 4,386,956 | 6/1983 | Roth et al. | 75/24 |
| 4,527,779 | 7/1985 | Roth et al. | 266/227 |
| 4,540,163 | 9/1985 | van Linden et al. | 266/201 |
| 4,565,572 | 1/1986 | van Linden et al. | 75/24 |
| 4,575,056 | 3/1986 | Julliard et al. | 266/227 |
| 4,772,320 | 9/1988 | van Linden et al. | 266/227 |
| 4,842,255 | 6/1989 | Innus et al. | 266/158 |
| 5,397,104 | 3/1995 | Roth | 266/227 |
| 5,439,501 | 8/1995 | Watanabe et al. | 75/313 |
| 5,599,379 | 2/1997 | Spoel et al. | 75/378 |
| 5,669,957 | 9/1997 | Roth | 75/585 |
| 5,811,056 | 9/1998 | Bramley | 266/227 |
| 5,882,580 | 3/1999 | Pownall | 266/205 |
| 5,906,790 | 5/1999 | Bramley | 266/205 |

FOREIGN PATENT DOCUMENTS

| | | |
|---|---|---|
| 406049550 | 2/1994 | Japan . |
| WO 96 32514 | 10/1996 | WIPO . |
| WO 96/32513 | 10/1996 | WIPO . |
| WO 96/32515 | 10/1996 | WIPO . |

*Primary Examiner*—Scott Kastler
*Attorney, Agent, or Firm*—Reese Taylor

[57] ABSTRACT

The dross pot comprises a generally conical vessel with a plurality of internal upstanding ribs which divide the dross pot into a plurality of segments and also provide a plurality of draining holes for molten metal.

12 Claims, 5 Drawing Sheets

PRESS HEAD AND DROSS POT FOR DROSS PROCESSING SYSTEM

The present invention relates to dross processing systems and more particularly to dross presses and to press heads and dross pots for such presses.

Dross presses are known and comprise a press head which is hydraulically controlled to press dross in a dross pot. A known dross press is described in co-pending Patent Applications Nos. 9507605.5 and 9507606.3 to the present applicant.

A problem which occurs with dross when pressed in a dross pot is that a skull is produced which can be too large for further processing.

A further problem which arises with dross pressing is that when the dross is pressed the residue can block the hole in the bottom of the dross pot and this can result in a substantial loss of metal recovered from the dross.

The present invention has a first object to produce a skull which will readily break and for a second object to provide a dross pot which does not readily block.

According to the present invention there is provided a dross pot for a dross press, the dross pot comprising a generally conical shape and being provided with a plurality of outstanding ribs internal to the generally conical shape.

In a preferred embodiment four ribs are provided, each rib being equidistantly spaced within the generally conical dross pot.

In a further embodiment all four ribs may be joined together at the base of the dross pot and there are provided four drainage holes for molten metal formed between the four ribs. In this manner blockage of the drainage holes is avoided and the ribs provide guidance for the molten metal down the respective drainage holes.

In further preferred embodiments three or five ribs are provided but the number of ribs may be varied.

Preferably each rib is of an inverted V or half round cross-section.

Embodiments of the present invention will now be described, by way of example with reference to the accompanying drawings, in which:

Figure 1:
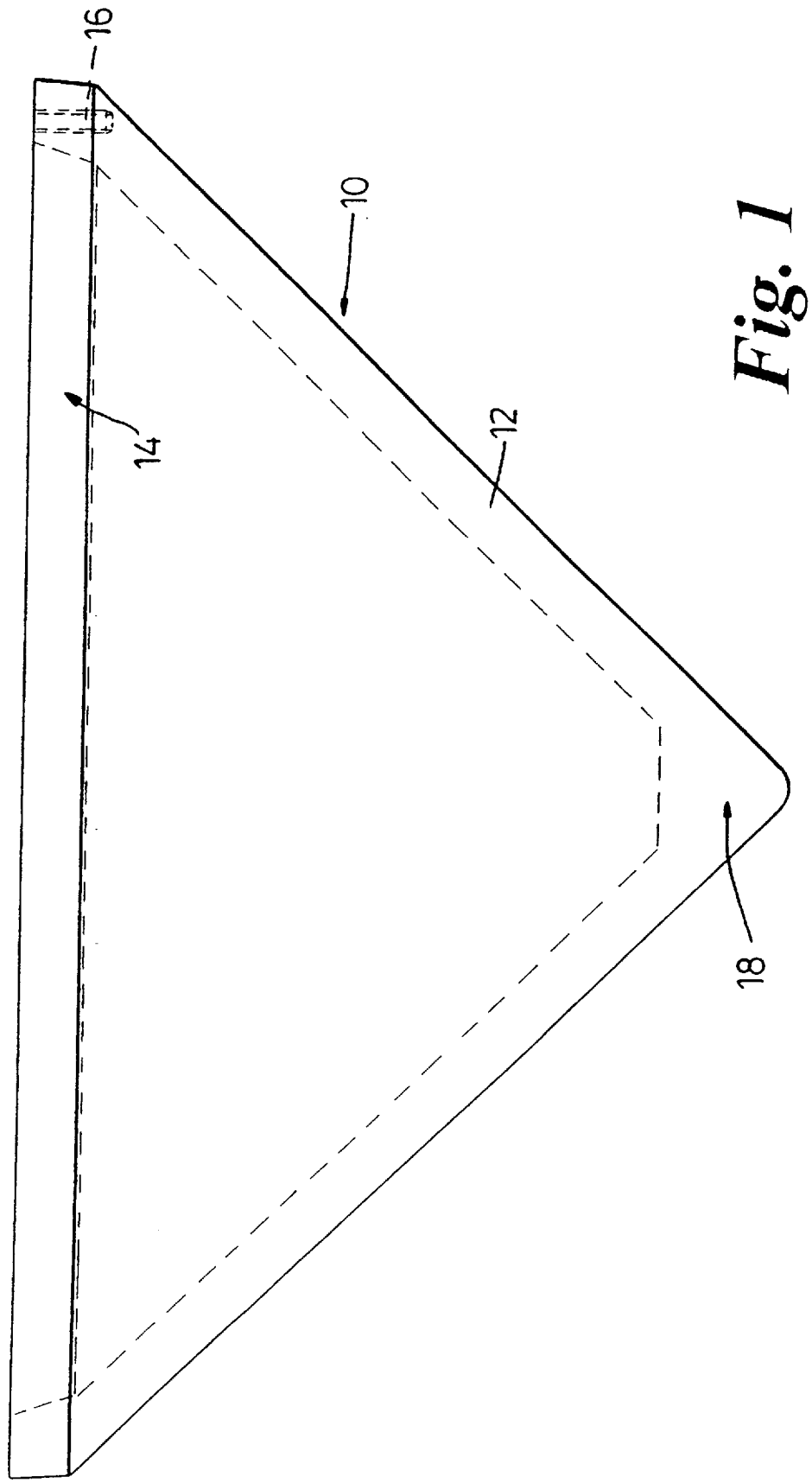
FIG. 1 shows a press head in accordance with the present invention.
Figure 2:
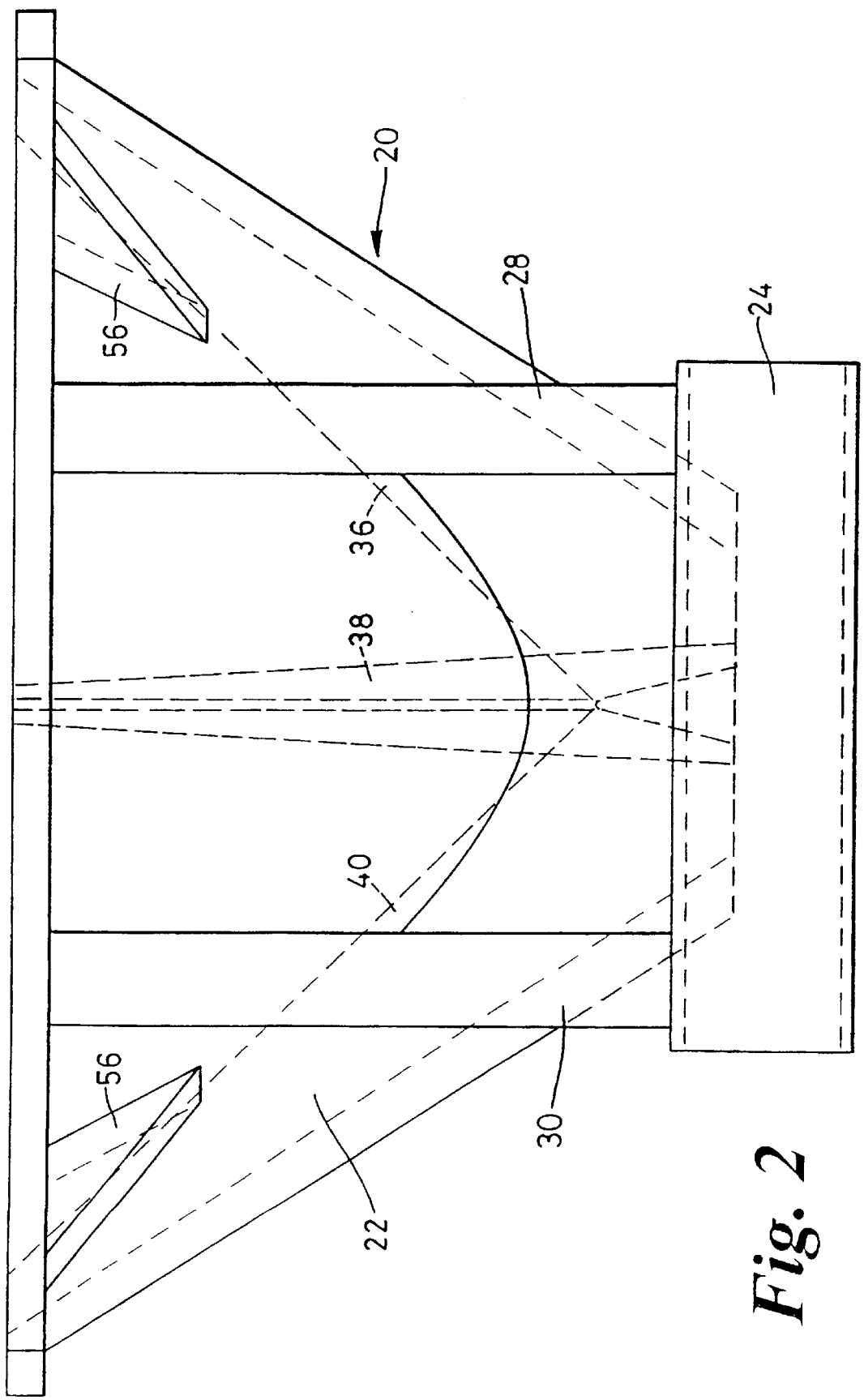
FIG. 2 shows in side elevation a dross pot in accordance with a preferred embodiment of the present invention.

With reference now to FIG. 1, the dross press head 10 comprises a generally conical shaped head 12 made from a suitable heat resistant metal. The head is provided with an upper plate 14 which is connected to the head 12 by, for example, bolts indicated at 16. The thickness of the walls of the head 12 and plate 14 may for example be 2 inches (50 mm) and the diameter of plate 14 may be 50 inches (1250 mm). The head is preferably provided with a reinforced or thickened central portion 18 which may be 5 inches (125 mm) in height.

Head 10 may therefore be of simple design and therefore will be robust and capable of withstanding temperature shocks more easily than a more complex design of head.

Head 10 may be provided with cooling, for example of the type exemplified in copending British Patent Application Nos. 9507605.5 and 9507606.3 to the same applicant.

The ribbed dross pot enables the head to be of a simple smooth sided design, for example conical pyramidal or even hemispherical. The use of a smooth sided head greatly improves the cooling effect of the head, especially when the head is provided with a forced cooling system. Thus, the dross is cooled more quickly and more efficiently thereby increasing the efficiency of the press.

The head 10 cooperates in known manner in the dross press with a dross pot 20 as shown in FIGS. 2 to 6.

The dross pot 20 comprises a generally conically shaped bowl 22 which is supported on two box section beams 24,26 (FIG. 3) with the assistance of four support buttresses 28,30,32 and 34.

Figure 3:
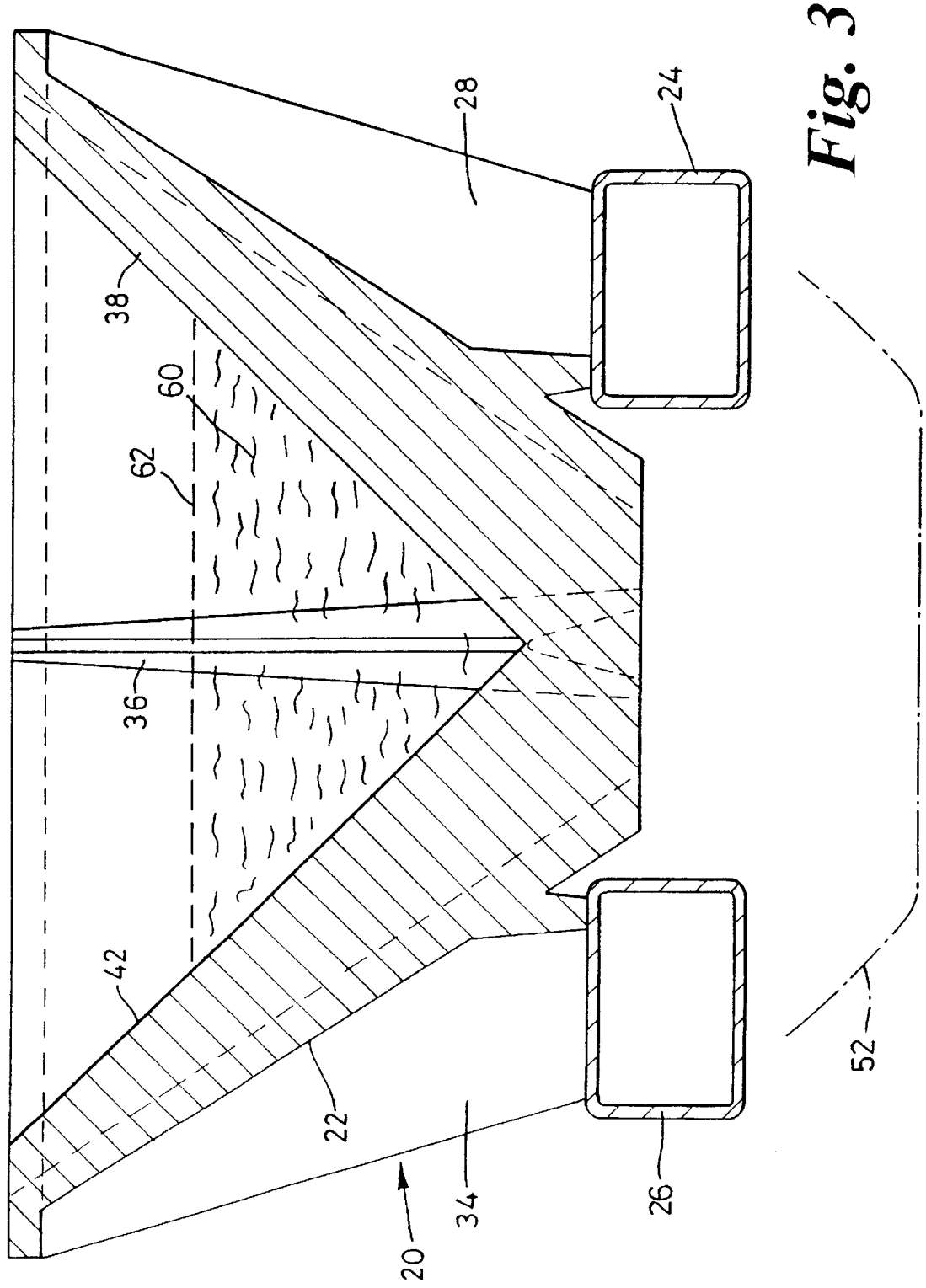
FIG. 3 shows a side elevational cross-section of the dross pot of FIG. 2.

Inside the conical bowl shaped dross pot 22 a plurality of upstanding ribs 36,38,40 and 42 are provided and these form, in the bottom of the bowl 22 a plurality of drainage holes 44,46,48 and 50 through which molten metal drains into a suitable mould 52 shown dotted in FIG. 3.

Figure 4:
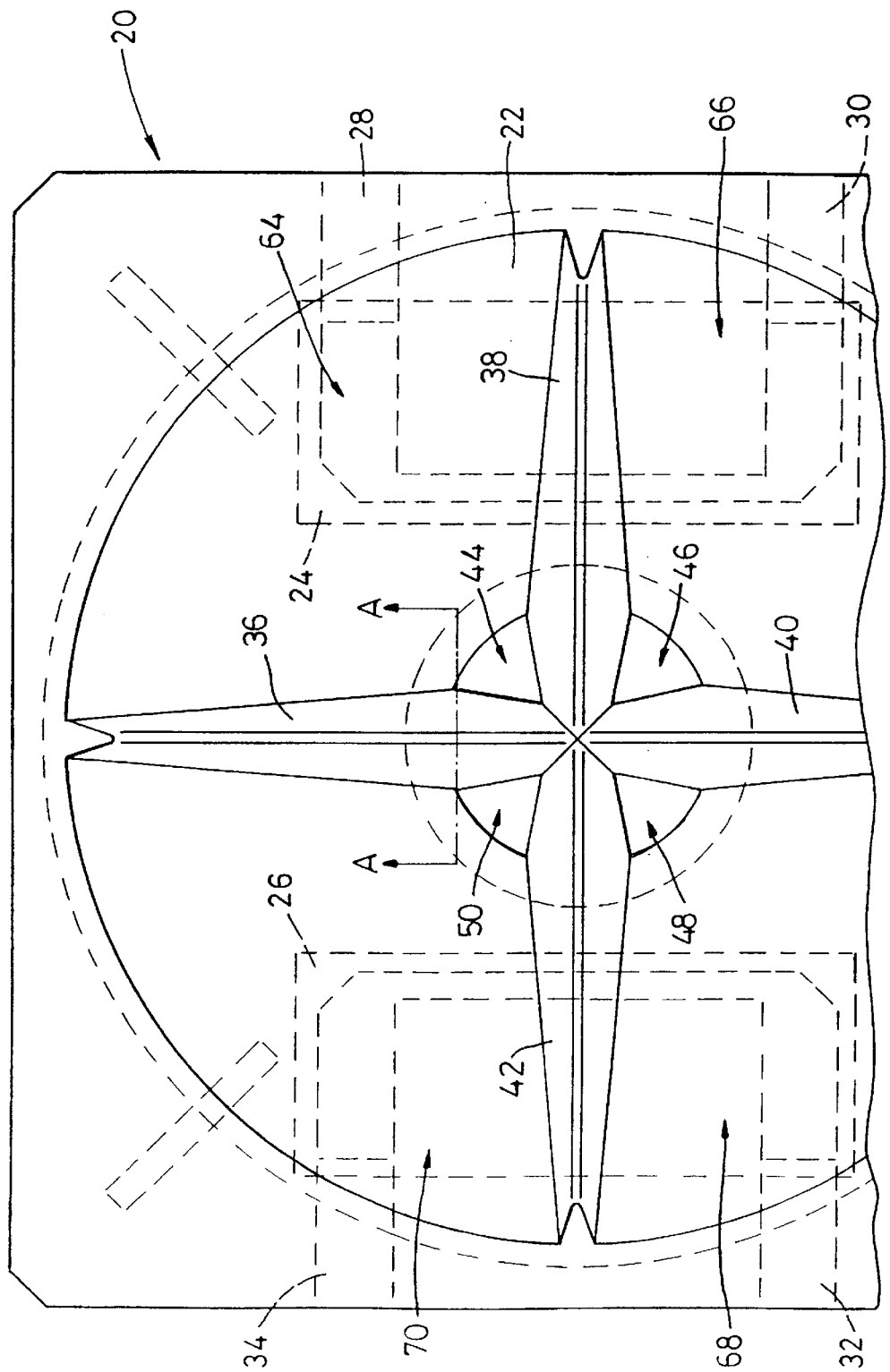
FIG. 4 shows the dross pot of FIG. 2 in partial plan view.
Figure 5:
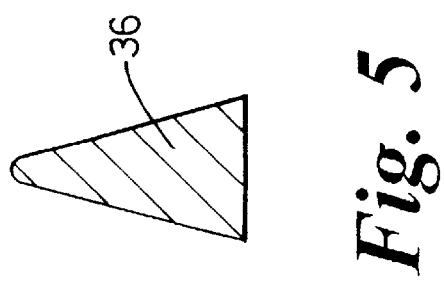
FIG. 5 shows in cross-section an upstanding rib of the dross pot of FIG. 2.

The upstanding ribs 36, 38, 40 and 42 are preferably of a generally inverted V or half round cross-section as shown in FIG. 5 which is a cross-section along A—A of FIG. 4. As shown in FIG. 4 the thickness of the rib preferably increases towards the bottom of the dross pot. At A—A the rib is in a preferred embodiment 5¾ inches wide and 8½ inches high.

Figure 6:
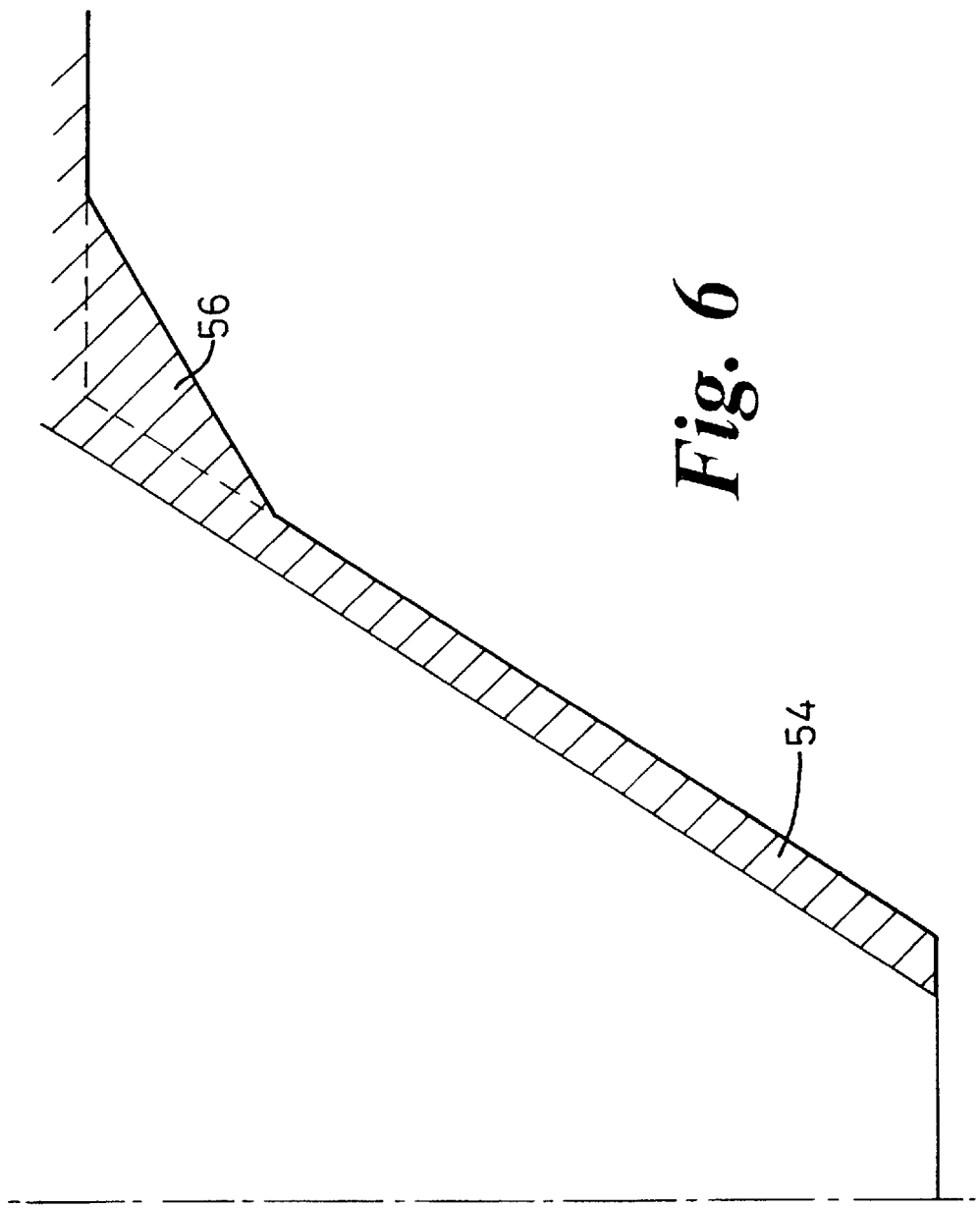
FIG. 6 shows in cross-section part of the wall section of the dross pot of FIG. 2.

With reference to FIG. 6 the wall section 54 of the dross pot 20 comprises a relatively thick wall, preferably 1½ inches thick, with a reinforcing flange structure 56 at its upper end.

In operation hot dross 60 is placed in dross pot 20, preferably to a more than half full level as indicated by dotted line 62 in FIG. 3.

Press head 10 is lowered onto the dross and presses the dross against the sides and upstanding ribs of dross pot 20. The presence of the upstanding ribs in essence divides dross pot 20 into a plurality of separate sections. In the preferred example shown there are four upstanding ribs and thus dross pot 20 is divided into four sections 64, 66, 68 and 70.

Each section 64 is provided with its own drainage hole 44 through which molten metal squeezed from the dross can pass.

The press head 20 will normally be cycled up and down to provide sequential pressure on the dross 60. At the end of the cycle the press head 20 will be lifted and the dross will generally be substantially cooled to form a "skull". This skull will be shaped to conform to the ribs 36, 38, 40 and 42 and the conical outer surface of head 10 and will therefore have four substantially thinner, weakened sections enabling the skull to be readily broken into a plurality (in this example four) of sections. This is of substantial advantage, particularly for dross presses capable of holding 500, 1000 or more kilograms of dross.

Skulls formed by conventional dross presses can weight 400 to 800 kilograms, dependent on the molten metal recovery and can be several inches thick and very difficult to break into pieces. The dross pot and press head of the present invention will still provide a skull of between 400–800 kilograms and several inches thick except that the ribs 36–42 will provide substantially weakened sections enabling the skull to be readily broken into four sections of 100–200 kilograms which will be much easier to handle and may be sized to be fed into grinding machines or other further processing apparatus. In other embodiments three or five upstanding ribs are provided thereby providing three or five drainage holes and three or five segments for the skull.

The present invention therefore provides a dross press with cooperating press head and dross pot which provides efficient dross processing with substantially less risk of drainage blockage and provides a skull which is readily broken for further processing.

What is claimed is:

1. A dross pot for a dross press having a press head with a generally continuous concave pressing surface, the dross pot comprising a generally conical shape and being provided with a plurality of integral outstanding ribs internal to the generally conical shape; wherein said ribs substantially conform to the pressing surface.

2. A dross pot as claimed in claim 1 in which four ribs are provided, each rib being equidistantly spaced within the generally conical dross pot.

3. A dross pot as claimed in claim 2 in which all four ribs are joined together at the base of the dross pot and there are provided four drainage holes for molten metal formed between the four ribs.

4. A dross pot as claimed in claim 1 in which three or five ribs are provided.

5. A dross pot as claimed in claim 1 in which each rib is of an inverted V or half round cross-section.

6. A dross pot as claimed in claim 1 further comprising support means including box section members for supporting the dross pot beneath a press head.

7. A press head used in combination with the dross pot of claim 1 in which the press head comprises a generally conical shape with a substantially smooth exterior.

8. A press head as claimed in claim 7 further comprising a reinforced section at the point end of the conical shape.

9. A dross pot for a dross press having a press head with a generally continuous concave pressing surface, the dross pot comprising a generally conical shape and being provided with a plurality of outstanding internal ribs, said ribs substantially conforming to the pressing surface; each said rib comprising an inverted V or half round cross-section and in which all ribs are joined together at the base of the dross pot and in which there are provided a plurality of drainage holes for molten metal formed between the plurality of said ribs providing guidance for the molten metal down the respective drainage holes.

10. A dross pot as claimed in claim 9 in which three ribs are provided.

11. A dross pot as claimed in claim 9 in which four ribs are provided.

12. A dross pot as claimed in claim 9 in which five ribs are provided.

* * * * *